Patented Dec. 14, 1948

2,456,395

UNITED STATES PATENT OFFICE 2,456,395

SYNTHESIS OF RIBOFLAVIN

Leo A. Flexser, Elizabeth, and Walter G. Farkas, Palisades Park, N. J., assignors to Hoffmann-La Roche Inc., Nutley, N. J., a corporation of New Jersey No Drawing. Application April 4, 1946, Serial No. 659,662

13 Claims. (Cl. 260—211)

This invention relates to the preparation of isoalloxazines. This class of compounds has recently assumed technical and therapeutic importance, riboflavin or vitamin $B_2$ being an outstanding example thereof.

It has been known that isoalloxazines can be prepared by the condensation of aromatic ortho diamines, in the form of their salts, such as the hydrochloride, with alloxan. In this connection note may be made of U. S. Patent 2,238,874 to Kuhn, Weygand, and Cook. This patent discloses the reaction of alloxan compounds with N-monosubstituted aromatic ortho diamines. The patent points out that the aromatic nucleus of the diamine may contain substituents, such as alkyl, methyl being particularly suitable. The isoalloxazines prepared by Kuhn et al. according to their patent are substituted at the nitrogen atom in the 9-position. The N-hydroxy-alkylated compounds include the polyhydroxy-alkylated compound known as riboflavin.

According to the above-mentioned patent, the N-monosubstituted aromatic ortho diamine base is condensed with alloxan, in the presence of mineral acids, such as hydrochloric acid or hydrobromic acid, whereby condensation of the corresponding salt is effected with alloxan. The patent points out that the condensation may also be performed while using previously prepared salts of the diamines. If the non-salt form is used, the condensation is preferably effected in the presence of a higher boiling solvent, such as nitrobenzene, pyridine, and the like. The patent points out that the reaction is advantageously carried out in the presence of heat.

We have found that the general reaction shown by U. S. Patent 2,238,874 involving the formation of isoalloxazines, proceeds very smoothly and with improved yields when the condensation of the ortho diamine or its salt, e. g. hydrohalide, is carried out in the presence of alloxan and alloxantin. The Kuhn patent mentioned above discloses the use of either alloxan or alloxantin. However, we have found that by the conjoint use of both these materials, greatly improved yields are obtained.

Although the reasons for the observed yield improvements, using both alloxan and alloxantin, cannot be decided with certainty, it is possible that the explanation lies in the fact that alloxan is a rather strong oxidizing agent. The diamines that are employed, on the other hand being reducing agents, may therefore react with alloxan with the formation of products other than the desired isoalloxazines, the yield being thereby reduced. In the presence of alloxantin, which is a reduction product of alloxan, the oxidation potential of the alloxan-alloxantin system is lowered and the oxidation of the diamines is minimized. Consequently, the yield of isoalloxazines is improved.

This theoretical explanation of the surprising effect obtained by our new process, it will be appreciated, is not to be taken as proven or conclusive. It is presented at this time as a possible basis for the remarkable results that are obtained by our new process. In confirmation of this explanation, we have found that the use of alloxan conjointly with various reducing agents also improves the yield. The stronger the reducing agent, the more pronounced is the beneficial effect. However, there is no advantage in using reducing agents which are more than sufficiently powerful to reduce alloxan itself. Such strong reducing agents cannot coexist in the same solution with alloxan, since alloxan will be converted to alloxantin and the final effect will be that of a mixture of alloxan and alloxantin.

Excessively powerful reducing agents or great excesses of alloxantin are also undesirable, since they tend to lower the yields by side reactions either with the reactants or with the normal reaction products. In general we prefer to use for each mole of alloxan, approximately one mole of alloxantin. However, this ratio is subject to wide variation, since the amount of alloxantin may be considerably less than the alloxan or considerably more than the alloxan. In referring to these ratios, it will be apparent that if a reducing agent is employed to form alloxantin, in situ, the amount of reducing agent should be such as to convert enough of the alloxan so as to leave a final ratio of alloxantin and alloxan that is suitable for the condensation. As stated before, the preferred ratio is about one mole of alloxantin to one mole of alloxan. Suitable reducing agents that may be employed to convert alloxan to alloxantin are hydrogen sulfide, stannous chloride, dialuric acid, and the like.

Our process is in general applicable broadly to the condensation of alloxan and alloxantin with diamines of the general formula given below, or salts thereof, such as the hydrohalides, e. g., hydrochloride:

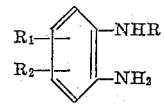

wherein R is a member of the group consisting of alkyl, polyhydroxyalkyl, and polyacyloxyalkyl, and wherein $R_1$ and $R_2$ are members, not necessarily identical, selected from the group consisting of hydrogen and lower alkyl. For the preparation of riboflavin, it will be apparent that $R_1$ and $R_2$ are methyl and R is ribityl. R may be tetraacyloxyalkyl, e. g. tetraacetylribityl. The condensation is carried out preferably in the presence of a solvent, such as a lower aliphatic alcohol, e. g., ethanol.

The following examples illustrate methods of operation of our invention.

*Example 1*

30.6 g. of the hydrochloride of 1,2-dimethyl-4-d-ribitylamino-5-amino benzene (0.1 mole) were suspended in 300 ml. of 95 percent ethanol and the mixture boiled under reflux while stirring. A stream of hydrogen sulfide was constantly bubbled into the mixture and 19.2 g. alloxan (0.12 mole) were gradually added in small portions during 3 hours. Refluxing was continued for 1½ hours after addition of the alloxan. The mixture was cooled, diluted with water and the precipitated 6,7-dimethyl-9-d-ribityl isoalloxazine (riboflavin) was filtered off, washed and dried. The weight was 31.7 g.

The same experiment performed in exactly the same manner but without the use of hydrogen sulfide gave a yield of only 29.6 g. of product.

*Example 2*

30.6 g. of the hydrochloride of 1,2-dimethyl-4-d-ribitylamino-5-amino benzene (0.1 mole) were suspended in 300 ml. of 95 percent ethanol and the mixture boiled under reflux while stirring. A mixture of 28.0 g. alloxan (0.175 mole) and 14.3 g. stannous chloride (.0635 mole) was added gradually in small portions and refluxing was then continued for 1½ hours. The product which was isolated as in Example 1 weighed 32.7 g.

Omission of the 14.3 g. stannous chloride in this example, the example being otherwise the same, gave only 22.6 g. of product.

*Example 3*

The experiment of Example 2 was repeated with a mixture of .0503 mole alloxan and .0503 mole alloxantin instead of the alloxan-stannous chloride mixture. The yield of riboflavin was 32.8 g.

*Example 4*

Example 3 was repeated, but using .0480 mole alloxan and .0635 mole alloxantin. Half of the alloxantin was added immediately and the other half toward the middle of the reaction, while the alloxan was gradually added in small portions. The product weighed 35.9 g.

*Example 5*

Example 3 was repeated but using 0.130 mole alloxan and .020 mole dialuric acid in place of the alloxan-alloxantin mixture. Half of the dialuric acid was added immediately and the other half at the middle of the reaction. The alloxan was gradually added in small portions. The product weighed 33.3 g.

We claim:

1. The process which comprises condensing a member of the class consisting of componds of the general formula:

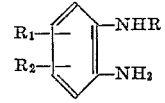

and salts thereof, with alloxan in the presence of alloxantin, wherein R is a member of the group consisting of alkyl, polyhydroxyalkyl, and polyacyloxyalkyl, and wherein $R_1$ and $R_2$ are members, not necessarily identical, selected from the group consisting of hydrogen and lower alkyl, the alloxan and alloxantin being employed in approximately equi-molecular proportions.

2. The process of claim 1 in which the alloxantin is produced by the reaction of alloxan and a reducing agent therefor.

3. The process of claim 1 in which the alloxantin is produced by the reaction of alloxan and stannous chloride.

4. The process of claim 1 in which $R_1$ and $R_2$ are methyl.

5. The process of claim 1 in which $R_1$ and $R_2$ are methyl and in which R is ribityl.

6. The process of claim 1 in which R is tetraacylribityl.

7. The process of claim 1 in which R is tetraacetylribityl.

8. The process of claim 1 in which the diamine is used in the form of a salt.

9. The process of claim 1 in which the diamine is used in the form of its hydrochloride.

10. The process of claim 1 in which the condensation is carried out in the presence of a lower aliphatic alcohol as a solvent.

11. The process of claim 1 in which the condensation is carried out in the presence of ethanol as a solvent.

12. The process which comprises condensing the hydrochloride of 1,2-dimethyl-4-d-ribitylamino-5-amino-benzene with alloxan and alloxantin, the alloxan and alloxantin being employed in approximately equi-molecular proportions.

13. The process of claim 12 carried out in the presence of ethanol.

LEO A. FLEXSER.
WALTER G. FARKAS.

REFERENCES CITED

The following references are of record in the file of this patent:

UNITED STATES PATENTS

| Number | Name | Date |
|---|---|---|
| 2,238,874 | Kuhn et al. | Apr. 15, 1941 |
| 2,261,608 | Tishler | Nov. 4, 1941 |